US012688628B1

(12) United States Patent
Chen et al.

(10) Patent No.: US 12,688,628 B1
(45) Date of Patent: Jul. 21, 2026

(54) AVATAR POSTING AND CUSTOMIZATION

(71) Applicant: Meta Platforms, Inc., Menlo Park, CA (US)

(72) Inventors: David Ray Chen, San Diego, CA (US); Jay Quin, San Francisco, CA (US); Seth Lee Weisfeld, Brooklyn, NY (US); Junian Ioffe, New York, NY (US); Neeraj Dinesh Khurana, New York, NY (US); Jamie Robert Barnes, Wembely (GB); Michael Groseclose, Mission Viejo, CA (US); Gian Paolo Pile Cruz, San Mateo, CA (US); Xiao Chen, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 219 days.

(21) Appl. No.: 18/195,312

(22) Filed: May 9, 2023

(51) Int. Cl.
| | |
|---|---|
| *G09G 5/00* | (2006.01) |
| *G06T 11/60* | (2006.01) |
| *H04L 51/52* | (2022.01) |

(52) U.S. Cl.
CPC .............. *G06T 11/60* (2013.01); *H04L 51/52* (2022.05)

(58) Field of Classification Search
CPC ....... G06F 9/4401; G06T 1/20; G06T 3/4007; G06T 9/00; G06T 11/001; G06T 11/60; H04L 51/51
USPC ......................................................... 345/581
See application file for complete search history.

(56) References Cited

U.S. PATENT DOCUMENTS

| | | | | |
|---|---|---|---|---|
| 10,169,897 | B1 * | 1/2019 | Geiger | A63F 13/63 |
| 10,659,405 | B1 * | 5/2020 | Chang | G06F 3/04817 |
| 10,856,037 | B2 * | 12/2020 | Knight | G09B 19/0038 |
| 2020/0159871 | A1 * | 5/2020 | Bowen | G06T 11/60 |
| 2020/0202603 | A1 * | 6/2020 | Choi | G06T 11/80 |
| 2021/0375022 | A1 * | 12/2021 | Lee | G06T 17/10 |

* cited by examiner

*Primary Examiner* — Gordon G Liu
(74) *Attorney, Agent, or Firm* — EVERSHEDS SUTHERLAND (US) LLP

(57) ABSTRACT

Systems, methods, and non-transitory computer readable media are configured to perform operations comprising providing a plurality of avatar poses associated with a user, receiving a selection of an avatar pose from the user, and generating an avatar sticker comprising the avatar pose.

15 Claims, 11 Drawing Sheets

100

Avatar Module 102

Post Module 104

Customization Module 106

112

240

238

230

234

236

232

220

222

250

500

AVATAR POSTING AND CUSTOMIZATION

FIELD OF THE INVENTION

The present technology relates to the field of digital communications. More particularly, the present technology relates to large scale real time communications.

BACKGROUND

People can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. The computing devices can allow users to express themselves to others in a variety of manners.

SUMMARY

Various embodiments of the present technology can include systems, methods, and non-transitory computer readable media configured to perform operations comprising providing a plurality of avatar poses associated with a user; receiving a selection of an avatar pose from the user; and generating an avatar sticker comprising the avatar pose.

In some embodiments, the avatar sticker further comprises at least one prop selected by the user.

In some embodiments, the avatar sticker further comprises text, a font, and a background selected by the user.

In some embodiments, the avatar pose reflects a facial expression and a body gesture of the user.

In some embodiments, the operations further comprise: generating a post including the avatar sticker for a content feed, wherein text, a font, and a background for the post can be selected by the user.

In some embodiments, the avatar sticker is a pre-generated avatar sticker from a listing of pre-generated avatar stickers not customized by the user.

In some embodiments, the avatar sticker was customized by the user.

In some embodiments, the avatar pose is based on a selfie image of the user.

In some embodiments, the operations further comprise storing the avatar sticker; and providing for the user a listing of avatar stickers comprising the avatar sticker.

In some embodiments, the avatar sticker comprises a plurality of panels, each panel of the plurality of panels including an associated avatar pose.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

Figure 1:
FIG. 1 illustrates a system including an avatar module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. The computing devices can allow users to express themselves to others in a variety of manners.

An increasingly popular form of online self expression is through use of an avatar. Instead of a traditional profile picture to represent oneself, a user may instead choose an avatar. An avatar representing the user can convey various features and characteristics of the user, including physical and non-physical traits of the user. An avatar typically can be a digital character representation of the user. In some instances, an avatar can reflect a desired sentiment, emotion, mood, or spirit of a user.

Conventional techniques impose significant limitations on the use of avatars. For example, a user may wish to post content in which the user appears to a content sharing system. In these situations, the user may wish to represent themselves in the content through an avatar instead of a profile picture. Unfortunately, conventional content sharing systems often do not provide functionality that allows the user to seamlessly and freely incorporate avatars into content. In some cases, an avatar may be capable of being shared only in a particular type of content or through a particular type of surface of a content sharing system but not capable of being shared in a different type of content or a different type of surface of the content sharing system. In this regard, content templates in which an avatar may be incorporated tend to be significantly limited in terms of their types and variations. As a related concern, conventional techniques can severely restrict the number and types of avatars that can be included in content. In addition, conventional techniques typically offer little or no capabilities to customize an environment in which an avatar is to appear, much less the avatar itself.

An improved approach rooted in computer technology overcomes the foregoing and other disadvantages associated with conventional approaches specifically arising in the realm of computer technology. The present technology can allow a user to incorporate an avatar sticker into a post for sharing in a content feed of a content sharing or communication platform, such as a social networking system. A listing of pre-generated avatar stickers can be included in a menu of options associated with creation of the post. The listing of pre-generated avatar stickers can be selected by the user. A particular pre-generated avatar sticker can be selected from the listing to include in the post. The post can be further customized by, for example, providing a text message with a desired font and selecting a suitable visual background. The post can then be published through the content sharing or communication platform. In addition, the present technology can allow a user to customize an avatar sticker. An avatar pose can be selected from a listing of avatar poses. In some instances, a custom avatar pose of the user can be created from a selfie camera capture. The avatar sticker can be further customized in a variety of manners. For example, a prop can be added to accompany the avatar pose. As another example, a background image for the avatar sticker can be selected. In addition, custom text stylized in a selected font can be added to the avatar sticker. The customized avatar sticker can be included in a post to the content sharing or communication platform. In this manner, the present technology provides robust capabilities to freely customize avatar stickers as well as posts in which avatar stickers appear. More details relating to the present technology are provided herein.

FIG. 1 illustrates an example system 100 including an avatar module 102, according to an embodiment of the present technology. As discussed in more detail herein, the avatar module 102 can allow selection of an avatar sticker from a listing of pre-generated avatar stickers to be incorporated into posts on a content sharing or communication platform or system. In addition, the avatar module 102 can allow customization of avatar stickers. In some embodiments, the system 100 can be implemented through a server system that is in communication over a communications network with various types of client computing devices, such as client computing devices 112. In some embodiments, the client computing devices 112 can include or be implemented with a user device 610, as discussed in relation to FIG. 6. In some embodiments, some or all of the functionality of the avatar module 102 can be performed by a server of the system 100. In some embodiments, some or all of the functionality of the avatar module 102 can be performed by an application running on a client computing device 112. In some embodiments, the functionality of the avatar module 102 can be distributed between a server of the system 100 and an application running on a client computing device 112. The system 100 can be associated with any suitable platform or system. Some illustrations discussed herein may reference a content sharing or communication platform or system as examples. However, the present technology also can apply to a messaging platform or system, a social networking platform or system, or the like.

In some instances, the system 100 can include at least one data store (not shown) accessible to the avatar module 102. The data store can maintain information required to support operation of the system 100 and the avatar module 102. For example, the data store can maintain data relating to pre-generated avatar stickers. As another example, the data store can maintain non-customized and customized avatar poses. The data store also can maintain information relating to various props, fonts, backgrounds, features, or other effects that can be selected to customize an avatar sticker or a post in which the avatar sticker appears. The data store can store other types of data utilized by the avatar module 102.

The client computing devices 112 can be, for example, any combination of mobile devices and non-mobile devices, such as smart-phones, laptops, tablets, desktop computers, watches, VR headsets (and controllers), etc. Each of the client computing devices 112 can include one or more applications running on the client computing device 112 and having functionality to support or perform the functionality of the present technology. An application on the client computing devices 112 can include an interface that is presented through a display of the client computing device 112. For example, a user of the client computing device 112 can interact with the application through appropriate inputs and commands (e.g., gestures) applied to a display through which the interface of the application is presented. Among other capabilities, the application can allow a user to provide inputs and commands to create customized posts that include avatar stickers and to create customized avatar stickers as desired by the user.

The avatar module 102 can include a post module 104 and a customization module 106. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the avatar module 102 can be implemented in any suitable combinations.

The post module 104 can provide for a user a listing of pre-generated avatar stickers from which an avatar sticker can be selected for a post. The listing of pre-generated avatar stickers can be presented through an interface generated by the post module 104. In some embodiments, the pre-generated avatar stickers can be generated by the content sharing or communication platform or system. In some instances, the pre-generated avatar stickers can be based on basic avatar models or templates associated with a user that have been modified to create the pre-generated avatar stickers.

Avatar stickers can vary in type and appearance. An avatar sticker can be a combination of a variety of elements. For example, an avatar sticker can include an avatar (or avatar pose) of a user. One or more avatars associated with the user can constitute a base, model, or template from which avatar poses and avatar stickers can be generated. A pose of an avatar associated with a user can communicate various types of information about the user, such as an expression of the user, a sentiment or emotion of the user, or a gesture of the user. For example, different avatar poses can depict a user expressing love, laughter, sadness, surprise, gloom, excitement, enthusiasm, and the like. A pose of an avatar also can communicate, for example, a status of the user, a physical disposition of the user, an activity performed by the user, an event relating to the user, etc.

In some instances, a pose of an avatar can depict a facial expression of a user. For example, an avatar pose can depict the user with a smile. As another example, an avatar pose can depict the user with a wink. As yet another example, an avatar pose can depict the user with a sad expression. In some instances, a pose of an avatar can depict a facial expression as well as physical or bodily expressions of the user. For example, an avatar pose can depict a user waving a hand to convey a greeting. As another example, an avatar pose can depict a user jumping to express enthusiasm. As yet another example, an avatar pose can depict a user with slumped shoulders to indicate sadness. The foregoing are merely examples and many other types of avatar poses can be included in avatar stickers.

In some instances, a pre-generated avatar sticker also can include props that can appear adjacent to an avatar pose in the avatar sticker. A prop appearing in an avatar sticker can depict an object or concept that complements an avatar pose to convey the intended meaning or message of the avatar sticker. For example, one or more hearts constitute props that, when presented with an avatar pose, can convey love or admiration by the user associated with the avatar. As another example, a ball (e.g., a football) can constitute a prop that, when held in an avatar pose, can communicate a sporting spirit exhibited by the user associated with the avatar. As yet another example, tears falling from the eyes of an avatar pose can function as a prop to convey that the user associated with the avatar is sad. The foregoing are merely examples and many different props can be used in an avatar sticker to convey different information.

In some instances, a pre-generated avatar sticker also can include text. Text can be utilized in an avatar sticker to better convey an intended expression or meaning of the avatar sticker. For example, an avatar sticker can include "Yesss!" as text accompanying an avatar pose to communicate a sentiment of strong agreement by the user associated with the avatar. As another example, an avatar sticker can include "Ha Ha Ha" as text in combination with an avatar pose to communicate laughter by the user associated with the avatar. As yet another example, an avatar sticker may include "Good Morning" as text accompanying an avatar pose to communicate that the user associated with the avatar is providing an enthusiastic morning greeting. In some embodiments, the listing of pre-generated avatar stickers can include tens or hundreds or more avatar stickers. The listing of pre-generated avatar stickers can be scrollable to facilitate review and selection from a large number of avatar stickers.

In some instances, the listing of pre-generated avatar stickers can be based on specific features or attributes associated with the user. For instance, avatar stickers that are consistent with a region, a culture, or a language associated with the user can be included in the listing of pre-generated avatar stickers. For example, avatar stickers that are relevant to a geographic region in which the user is located can be presented to the user. As another example, avatar stickers included in the listing of pre-generated avatar stickers can reference cultural events or concepts when they are associated with a culture with which the user identifies. As another example, avatar stickers in the listing of pre-generated avatar stickers can include text in languages known to the user. Many variations are possible.

In some examples set forth herein, static (non-moving) avatar poses and static avatar stickers are discussed. The present technology also can apply to dynamic (moving) or animated avatar poses and dynamic or animated avatar stickers. Further, while avatar stickers associated with a single user are discussed in certain examples set forth herein, the present technology also can apply to an avatar sticker that includes avatar poses of multiple users (e.g., two users, three users, a group of users, etc.).

The interface generated by the post module 104 can prompt a user to select a pre-generated avatar sticker from the listing of pre-generated avatar stickers or to create an avatar sticker. Creation of an avatar sticker by the avatar module 102 is discussed in more detail below. To select a pre-generated avatar sticker, the user can review and scroll through the listing of pre-generated avatar stickers. Upon selection of a particular avatar sticker, the interface generated by the post module 104 can prompt the user to provide text. A text input tool, such as a virtual keyboard, can be provided through the interface to allow the user to enter text for the post that will include the selected avatar sticker. The text can be any expression, statement, or message that the user desires to accompany the selected avatar sticker. For example, the text can provide background or explanation regarding the circumstances or events that relate to the avatar sticker or the post in which the avatar sticker will appear. In addition, the interface can provide various font styles in which the text can appear. The font styles can be any number of different font styles. The user can be prompted to select one or more font styles for the entered text. After selection by the user of the pre-generated avatar sticker, text, and font, the post module 104 can publish the post.

FIGS. 2A-2E illustrate example views of an interface of an application, according to an embodiment of the present technology. In some embodiments, the views of the interface can be generated by the avatar module 102. For example, the design and operation of the interface can be consistent with the described functionality of the post module 104. The functionality of the post module 104 can be implemented in whole or in part by an application running on a client computing device of a user. The interface of the application can be presented through a screen of the client computing device. The user of the client computing device can provide inputs and commands through the interface to interact with and control the application in accordance with the design and operation of the client computing device.

Figure 2B:
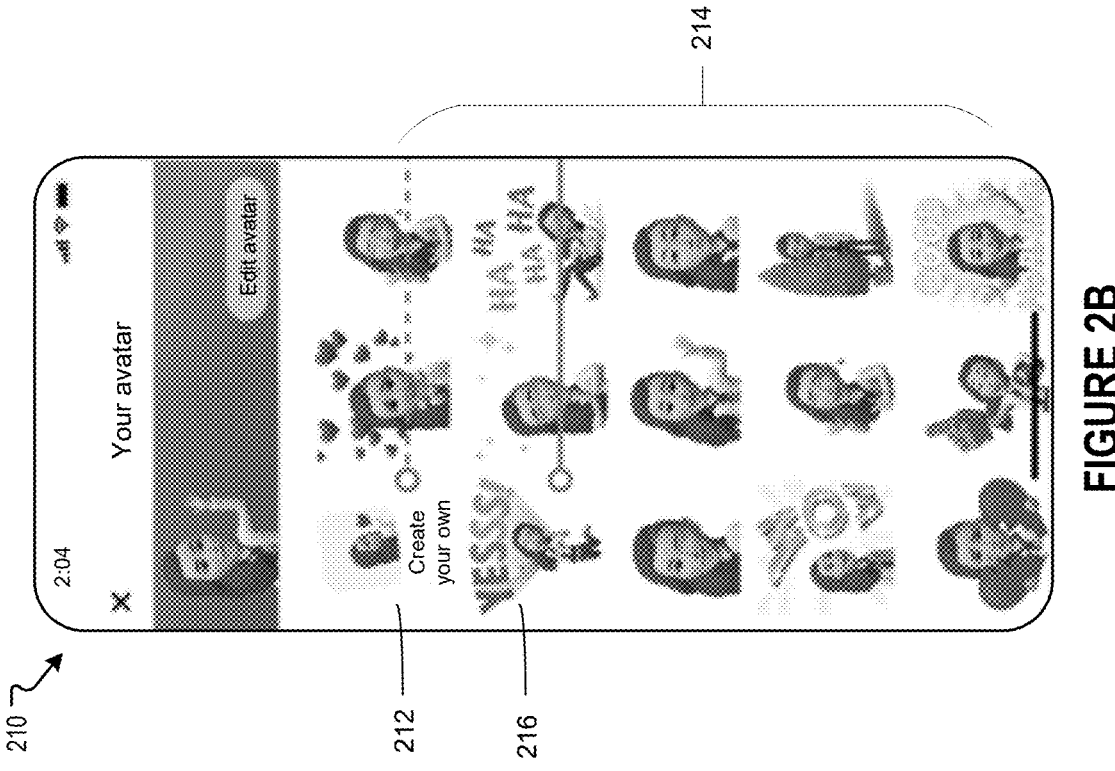
FIGS. 2A-2E illustrate example views of an interface configured to include an avatar sticker in a post for a content feed, according to an embodiment of the present technology.
Figure 2A:
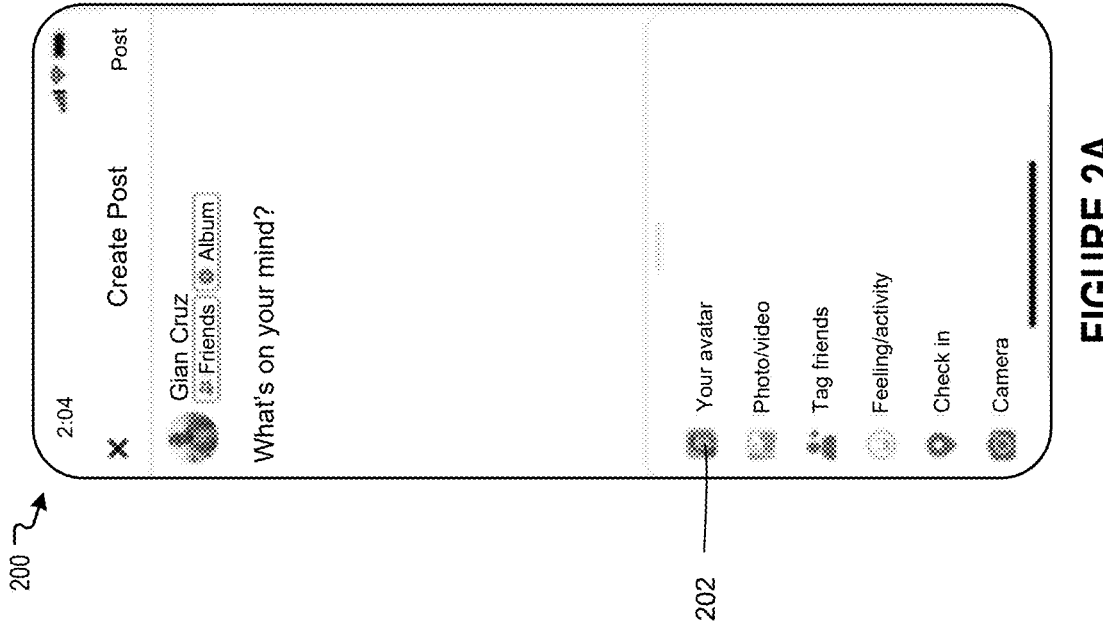

In FIG. 2A, a view 200 of the interface of the application can be presented to the user. The interface can be a surface or entry way for creation of a post including an avatar sticker. The interface can provide options to include various types of information in the post. The various types of information can include, for example, an avatar sticker associated with the user, a photo or video, a tag, a sentiment, a check in, or a camera view to capture an image or video. When chosen by the user, an option 202 provided by the interface can cause presentation of a listing of pre-generated avatar stickers for review and selection by the user.

In FIG. 2B, a view 210 of the interface of the application can be presented to the user in response to selection of the option 202. The interface can include an option 212 for the user to create or customize an avatar sticker. The creation or customization of an avatar sticker is discussed in more detail herein. The interface also can include a listing 214 of pre-generated avatar stickers. In some instances, the listing 214 of pre-generated avatar stickers can include tens, hundreds, or even thousands of avatar stickers. The avatar stickers in the listing 214 of pre-generated avatar stickers are not limited to any type, portion, or subset of avatar stickers available to or associated with the user through the content sharing or communication platform or system. In other words, the listing 214 of pre-generated avatar stickers can include all avatar stickers available to or associated with the user. Accordingly, the listing 214 of pre-generated avatar stickers can be provided in a manner that allows the user to easily navigate through the avatar stickers. For example, the listing 214 of pre-generated avatar stickers can be scrollable by the user for convenient and efficient review of the avatar stickers. In this example, the user can select an option 216 corresponding to a particular avatar sticker from the listing 214 of pre-generated avatar stickers to include in the post.

Figure 2D:
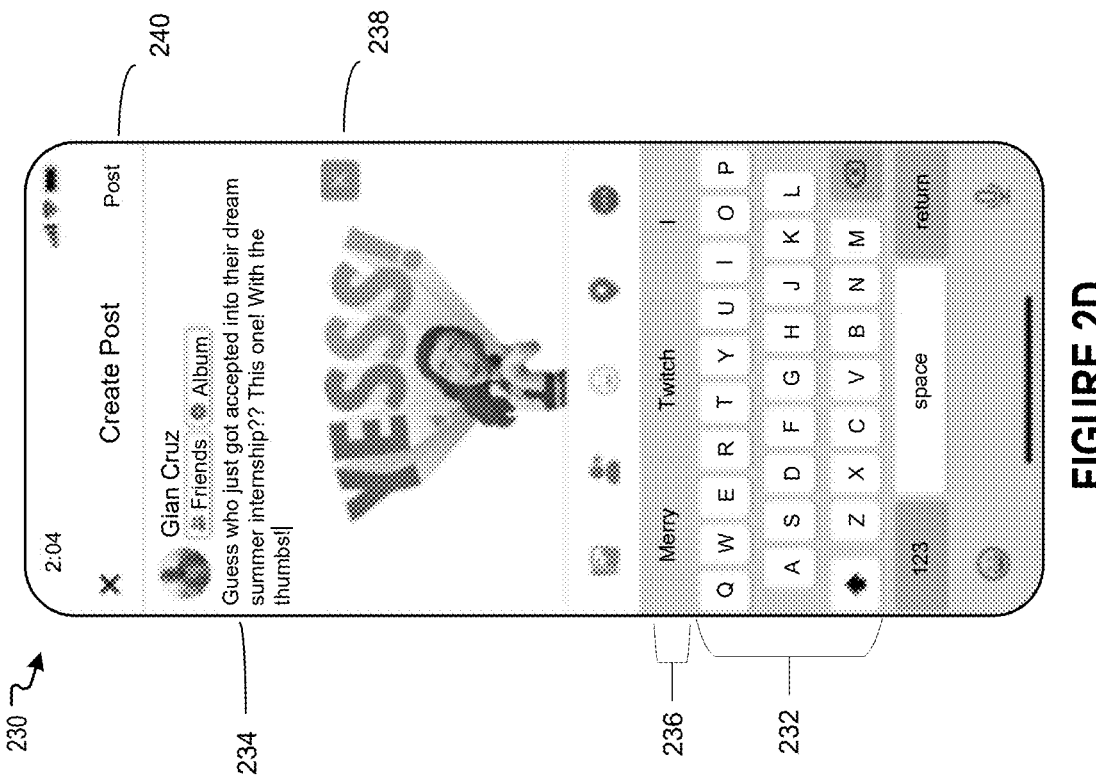
Figure 2C:
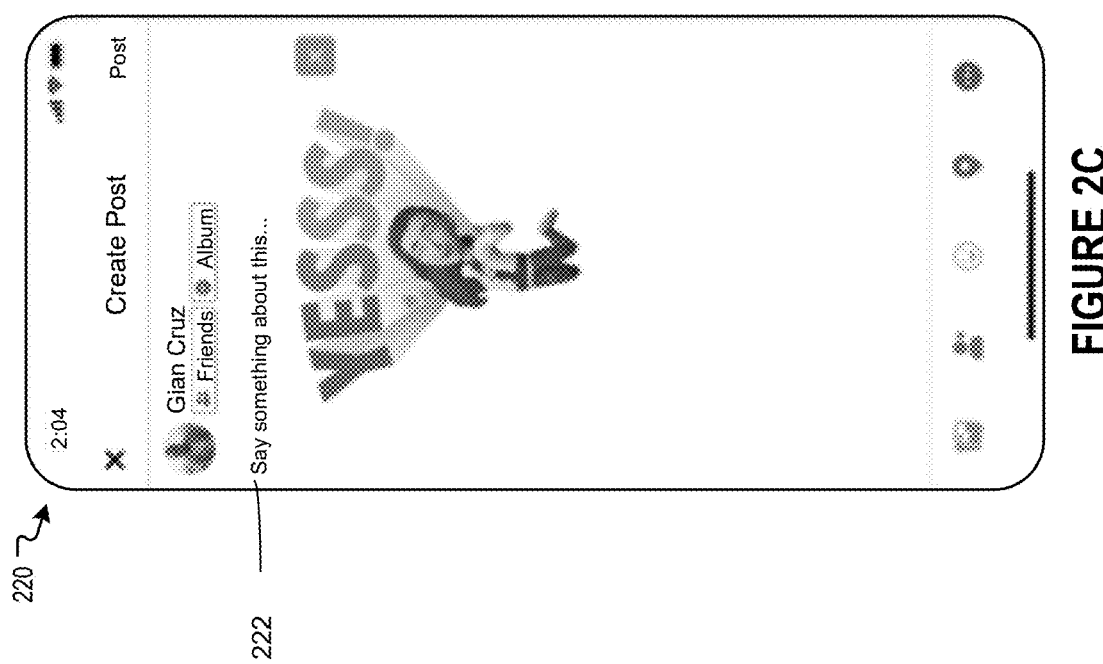

In FIG. 2C, a view 220 of the interface of the application can be presented to the user in response to selection of the option 216. The interface can include a prompt 222 for the user to enter text for the post. In response to an input or command by the user (e.g., a gesture), the interface can provide a tool to enter text.

In FIG. 2D, a view 230 of the interface of the application can be presented to the user in response to an input or command by the user to enter text. The interface can include a virtual keyboard 232 for the user to type a desired statement or message to be included in the post. Through the virtual keyboard 232, the user can provide text 234 for the post. The text 234 can complement the avatar sticker by providing relevant context, background, or explanation. In addition, the interface can provide various font selections 236 to stylize the appearance of the text 234. The interface also can provide an option 238 that, when selected, can allow the user to remove the originally selected avatar sticker and replace it with another avatar sticker. When the post is finalized, the user can select an option 240 to publish the post.

Figure 2E:
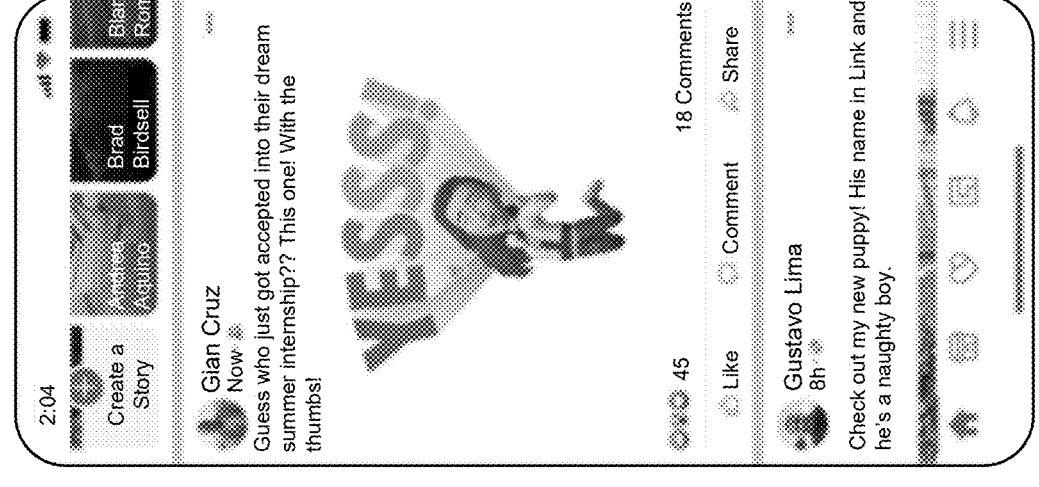

In FIG. 2E, a view 250 of an interface of the application can be presented to another user in response to selection by the user of the option 240 to publish the post. The application can include the post in a content feed provided for the other user. As shown, the post includes the avatar sticker selected by the user. The post also includes related text entered by the user as well as presentation of the text in the font selected by the user.

In FIG. 1, the avatar module 102 also can include the customization module 106. The customization module 106 can allow a user to customize an avatar sticker. The customization module 106 can provide functionality of a studio through which an avatar sticker can be created by the user. The customization module 106 can provide a listing of avatar poses of the user from which an avatar pose can be selected. In some embodiments, the avatar poses can be preexisting avatars that have been previously generated. The listing of avatar poses can be presented through an interface generated by the customization module 106. The listing of avatar poses can include avatars depicting the user in a multitude of different poses. For example, the avatar poses can include various facial expressions of the user. As another example, the avatar poses can include both various facial expressions of the user as well as different physical or bodily gestures of the user.

The interface generated by the customization module 106 can prompt the user to select an avatar pose from the listing to create an avatar sticker. Upon selection of an avatar pose, the interface can prompt the user to further customize the avatar sticker being created through the use of various editing tools. For example, the interface can allow the user to add text to appear with the avatar pose. In some instances, a font can be selected by the user to stylize the appearance of the text. The interface also can provide a plurality of backgrounds for the avatar sticker from which the user can select a particular background. For example, the plurality of backgrounds can include backgrounds of a uniform color or shade, or backgrounds with a color gradient or other design. As another example, the plurality of backgrounds can include, for example, stock or predetermined images (or video). In some embodiments, the plurality of backgrounds can include, for example, backgrounds generated by the user, such as images captured or selected by the user. After the avatar sticker is created, the avatar sticker can be included in the creation of a post, as described herein. In some embodiments, an avatar sticker can be configured in a multi-panel format (reflecting a "meme" format). A multi-panel format associated with an avatar sticker can include multiple avatar poses. For example, an avatar sticker configured in a two-panel format can include a selected first avatar pose included in a first panel and a selected second avatar pose included in a second panel. Each panel can be separately customized, as described. For example, a background, text, and a font can be selected for each panel. Many variations are possible.

As referenced, in some embodiments, the interface generated by the customization module 106 can include an option that prompts the user to take an image (or video) of the user themselves (i.e., a selfie). When the option is selected, the customization module 106 can enter a selfie mode. The interface can provide an indication to the user that the application is in the selfie mode. In the selfie mode, the customization module 106 can access a camera of the computing device of the user that is directed at the user. Through the camera, facial expressions and body gestures of the user can be tracked by the customization module 106. The customization module 106 can transpose or mirror in real time (or near real time) the facial expressions and body gestures of the user onto a template or base avatar of the user. A resulting avatar of the user that is reflecting the facial expressions and body gestures of the user can be presented through the interface in real time. The interface can include a shutter button to allow the user to generate or capture an image (or video) from the presented avatar of the user. The customization module 106 can create a static avatar pose based on capture of an image and a dynamic (or animated) avatar pose based on capture of a video.

The interface can provide the user with options to further customize an avatar sticker that includes an avatar pose. For example, the interface can allow the user to add text, apply a selected font, and select a background. As another example, the interface can allow the user to add props to the avatar sticker, move the avatar pose into different positions in the avatar sticker, change the location of the avatar pose in the avatar sticker, resize the avatar pose in the avatar sticker, and the like. In some embodiments, a customized avatar sticker can be saved. The customized avatar sticker can be maintained by the content sharing or communication platform or system for later use by the user. For example, a listing of pre-generated avatar stickers associated with a user can include customized avatar stickers previously created by the user.

FIGS. 3A-3F and FIG. 4 illustrate example views of an interface of an application, according to an embodiment of the present technology. In some embodiments, the views of the interface can be generated by the avatar module 102. For example, the design and operation of the interface can be consistent with the described functionality of the customization module 106. The functionality of the customization module 106 can be implemented in whole or in part by an application running on a client computing device of a user. The interface of the application can be presented through a screen of the client computing device. The user of the client computing device can provide inputs and commands through the interface to interact with and control the application in accordance with the design and operation of the client computing device.

Figure 3B:
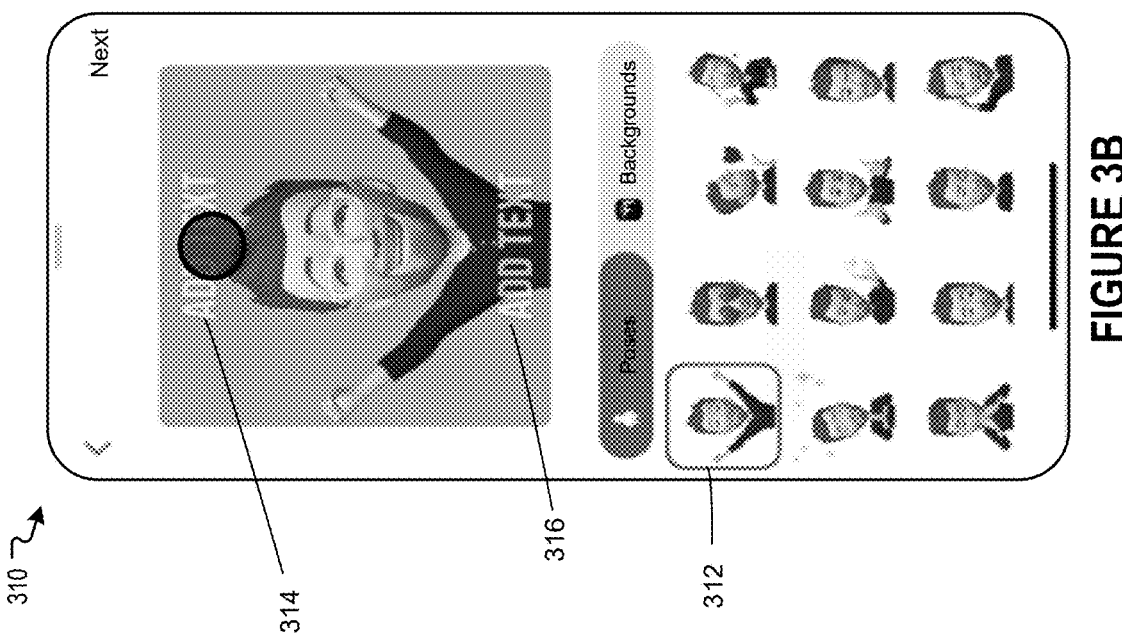
FIGS. 3A-3F illustrate example views of an interface configured to allow customization of an avatar sticker, according to an embodiment of the present technology.
Figure 3A:
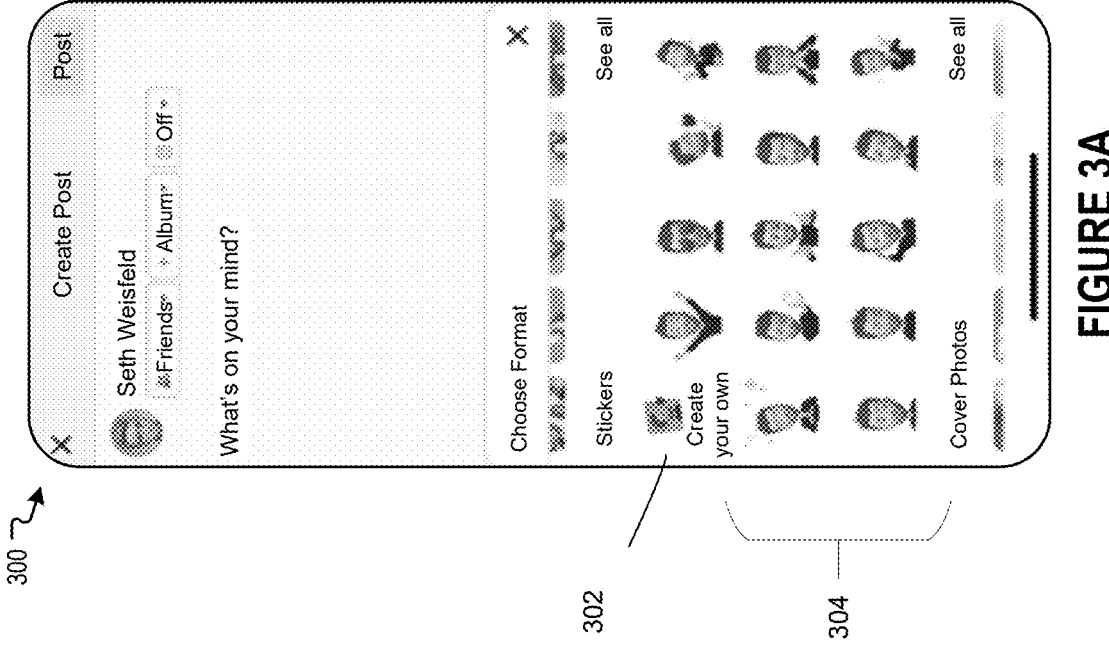

In FIG. 3A, a view 300 of the interface of the application can be presented to the user. The interface can be a surface or entry way for customization of an avatar sticker. The interface can include an option 302 for the user to create or customize an avatar pose. The interface also can include a listing 304 of avatar poses. The listing 304 of avatar poses can include any number of avatar poses. For example, the listing 304 of avatar poses can be scrollable by the user to facilitate their consideration by the user.

In FIG. 3B, a view 310 of the interface of the application can be presented to the user in response to selection of an avatar pose in the listing 304 of avatar poses. As shown, the user has selected an option 312 corresponding to a particular avatar pose from the listing 304 of avatar poses. Based on the selection of the option 312, the corresponding avatar pose is presented through the interface. The interface can include a prompt 314 to allow the user to add text to accompany the avatar pose. Through selection of the prompt 314, the user can add text through, for example, a virtual keyboard. In some instances, the interface can provide different locations to add text. For example, the prompt 314 for text can be positioned at a first location where entered text can appear in the avatar sticker. As shown, another prompt 316 for text can be positioned at a second location where additional entered text can appear.

Figures 3C, 3D:
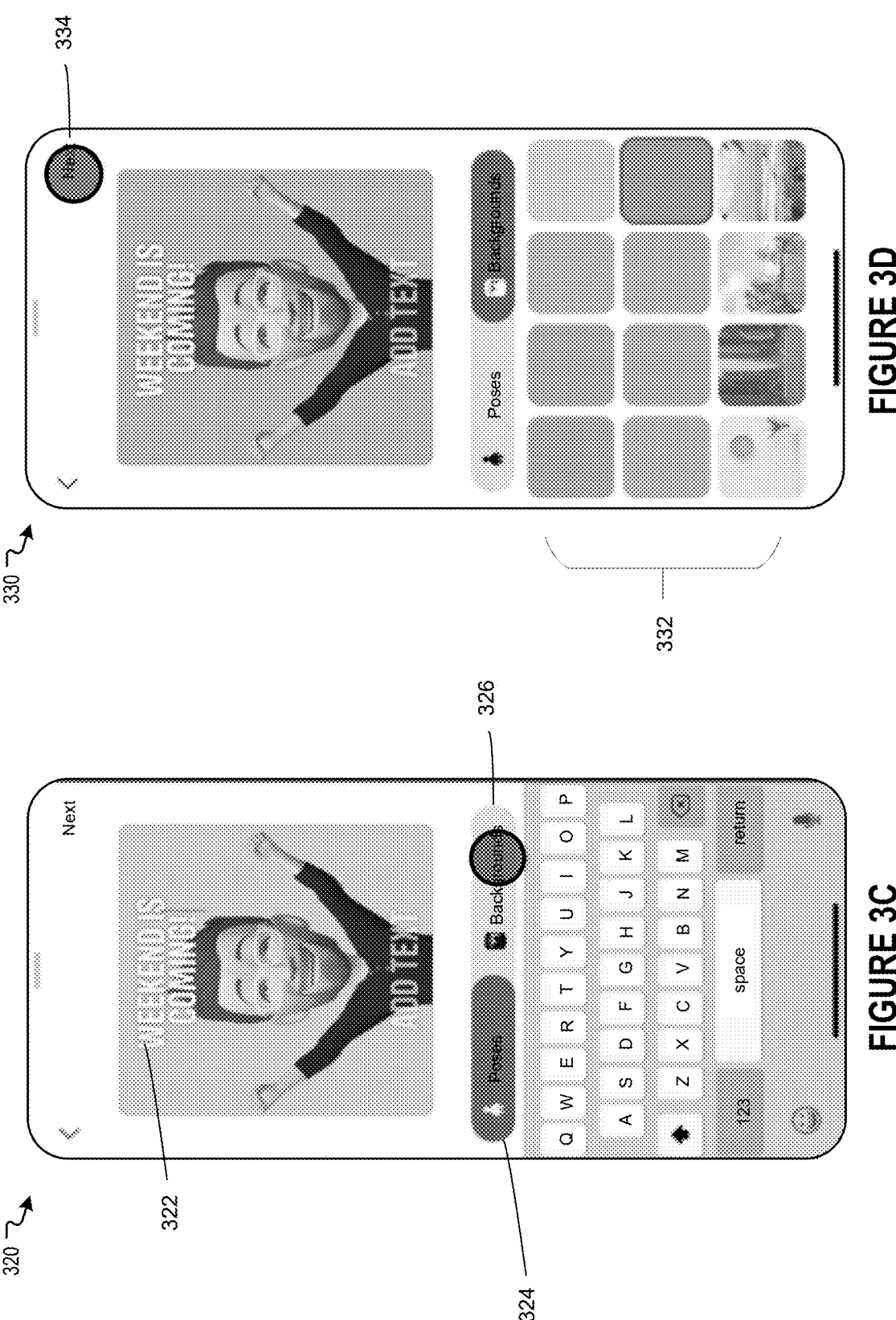

In FIG. 3C, a view 320 of the interface of the application can be presented to the user in response to entry of text. As shown, text 322 (e.g., "Weekend Is Coming!") has been added by the user to accompany the avatar pose. The interface can include a button 324 that when selected allows the user to select a different avatar pose from the listing of avatar poses. The interface also can include a button 326 that when selected allows the user to select a background for the avatar sticker.

In FIG. 3D, a view 330 of the interface of the application can be presented to the user in response to selection of the button 324. The interface can provide a section 332 containing a variety of backgrounds. The backgrounds can include stock backgrounds and backgrounds (e.g., images) selected or generated by the user. The user can select a particular background from the section 332 to use as a background for the avatar sticker. Once the background is selected, a button 334 can be selected to advance in the process to customize an avatar sticker.

Figures 3E, 3F:
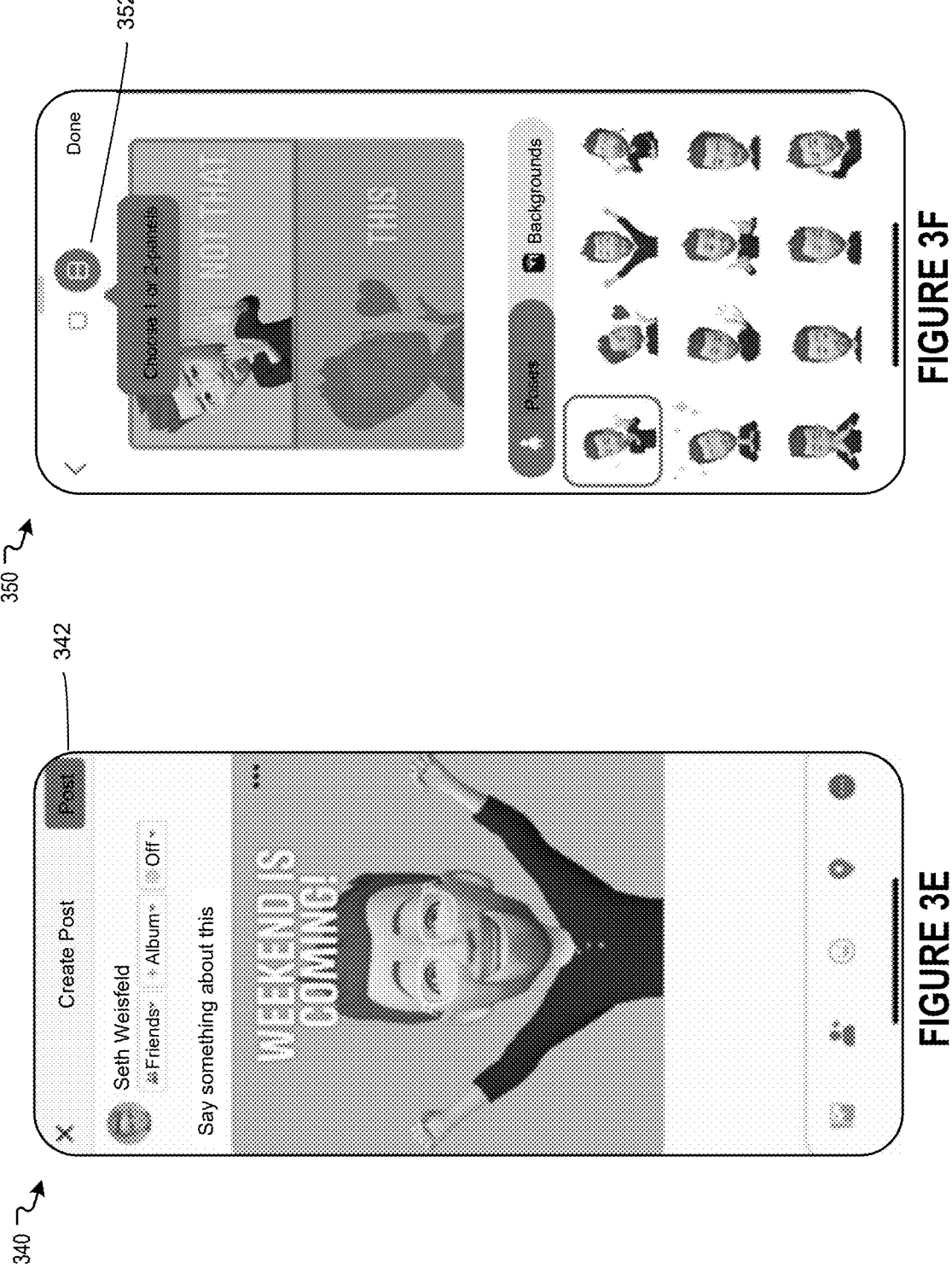

In FIG. 3E, a view 340 of the interface of the application can be presented to the user in response to selection of the button 334. Once finalized, the avatar sticker can be used in a variety of contexts and surfaces. For example, the interface can allow the avatar sticker to be included in a post for a content feed. The interface can allow the post to be customized in various ways, as described herein. For example, text can be entered to accompany the avatar sticker in the post. Once the post is finalized, a button 342 can be selected to publish the post.

In FIG. 3F, a view 350 of the interface of the application can be presented to the user in response to selection of a button 352 to create a multi-panel format (e.g., "meme" format) for an avatar sticker. In the multi-panel format, the interface can segment an avatar sticker into a predetermined number of panels or sections, such as two panels. Each panel can include a different (or the same) avatar pose selected by the user. Further, each panel can be separately customized to include, for example, text, a font, and a background selected by the user. Although two panels are shown as an example, any number of panels are possible in other examples.

Figure 4:
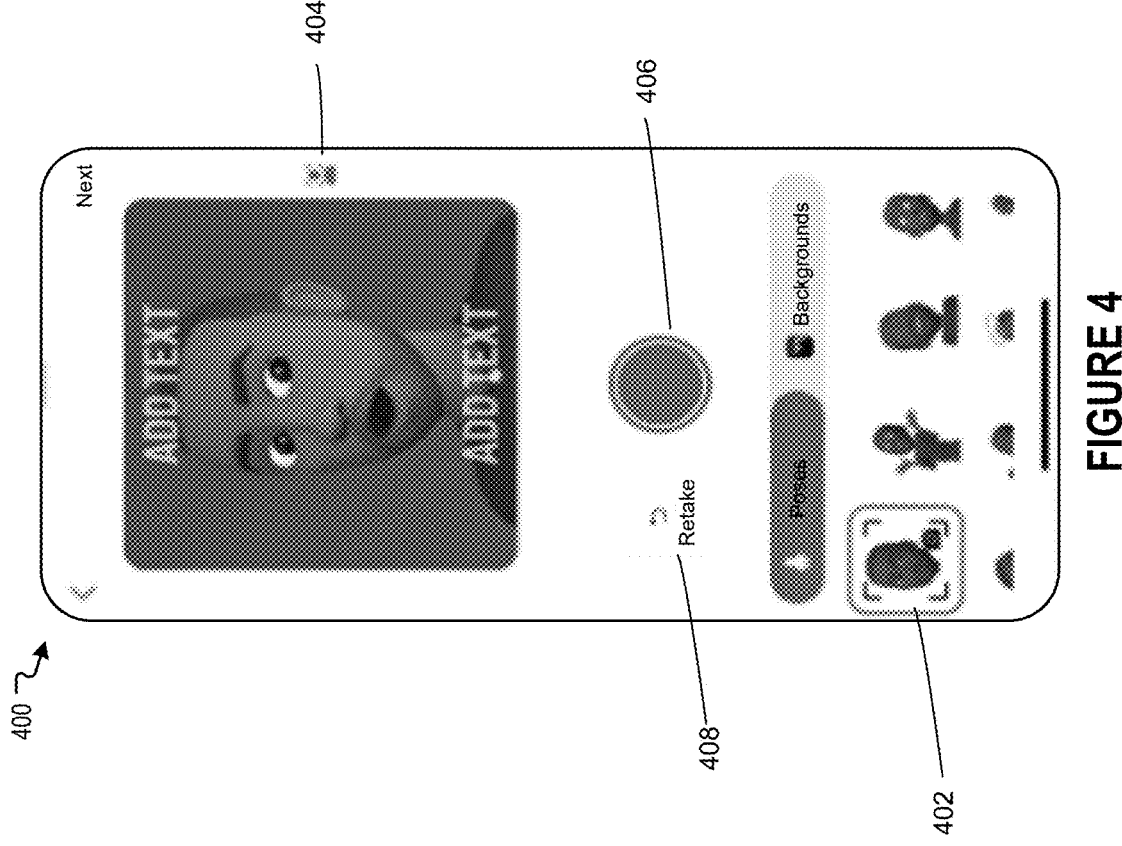
FIG. 4 illustrates an example view of an interface configured to allow capture of an avatar pose, according to an embodiment of the present technology.

In FIG. 4, a view 400 of the interface of the application can be presented to the user. The interface can be a surface or entry way for customization of an avatar sticker through capture of a selfie image (or video). The interface can include an option 402 for the user to select a selfie mode. As shown, the option 402 is highlighted because the selfie mode has been selected. In some embodiments, an indicator 404 can be activated or displayed to indicate to the user that the application is in selfie mode. A real time depiction of the user as an avatar can be presented through the interface. The interface can include a shutter button 406 to allow the user to capture an image of their avatar in a desired pose. The captured avatar pose can be used for the avatar sticker. In addition, the interface can include a button 408 to allow the user to retake images until a desired avatar pose is captured. The interface also can provide other functionality to further customize the avatar sticker, as described herein. For example, the interface can allow the user to add text, select a font, and select a background according to the preferences of the user. Many variations are possible.

Figure 5:
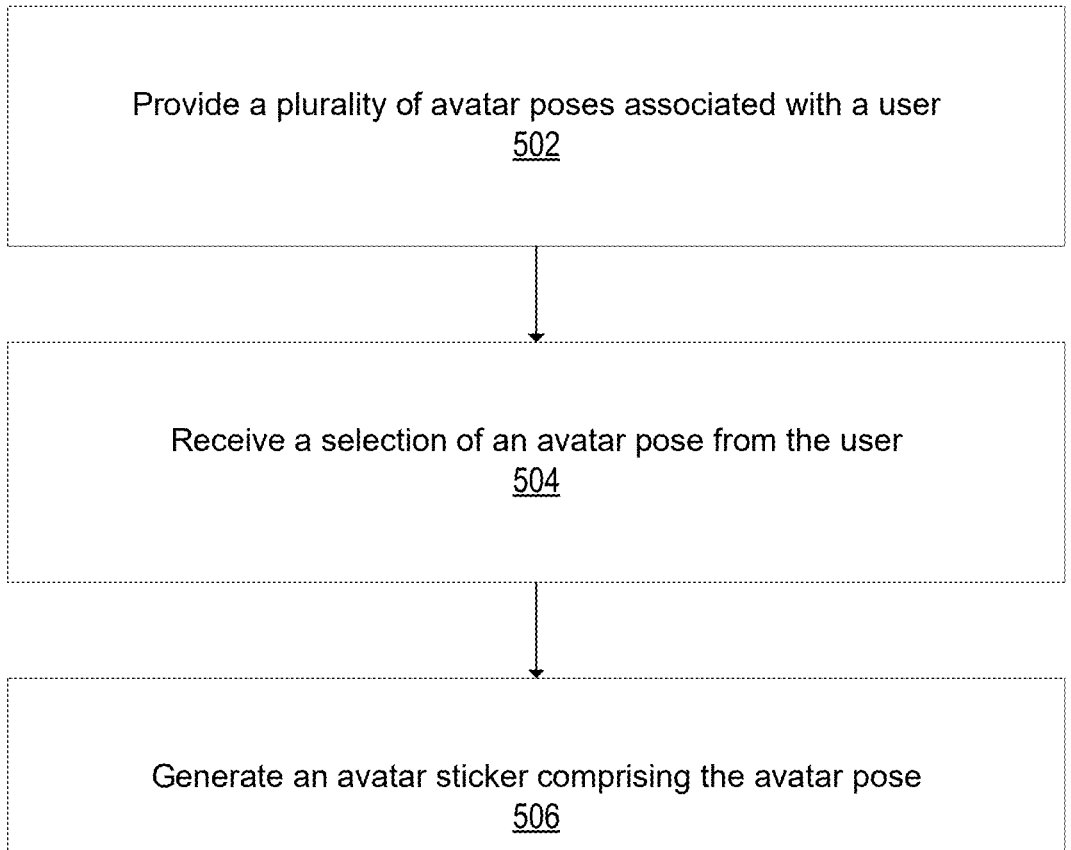
FIG. 5 illustrates an example method, according to an embodiment of the present technology.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the method 500 can provide a plurality of avatar poses associated with a user. At block 504, the method 500 can receive a selection of an avatar pose from the user. At block 506, the method 500 can generate an avatar sticker comprising the avatar pose.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
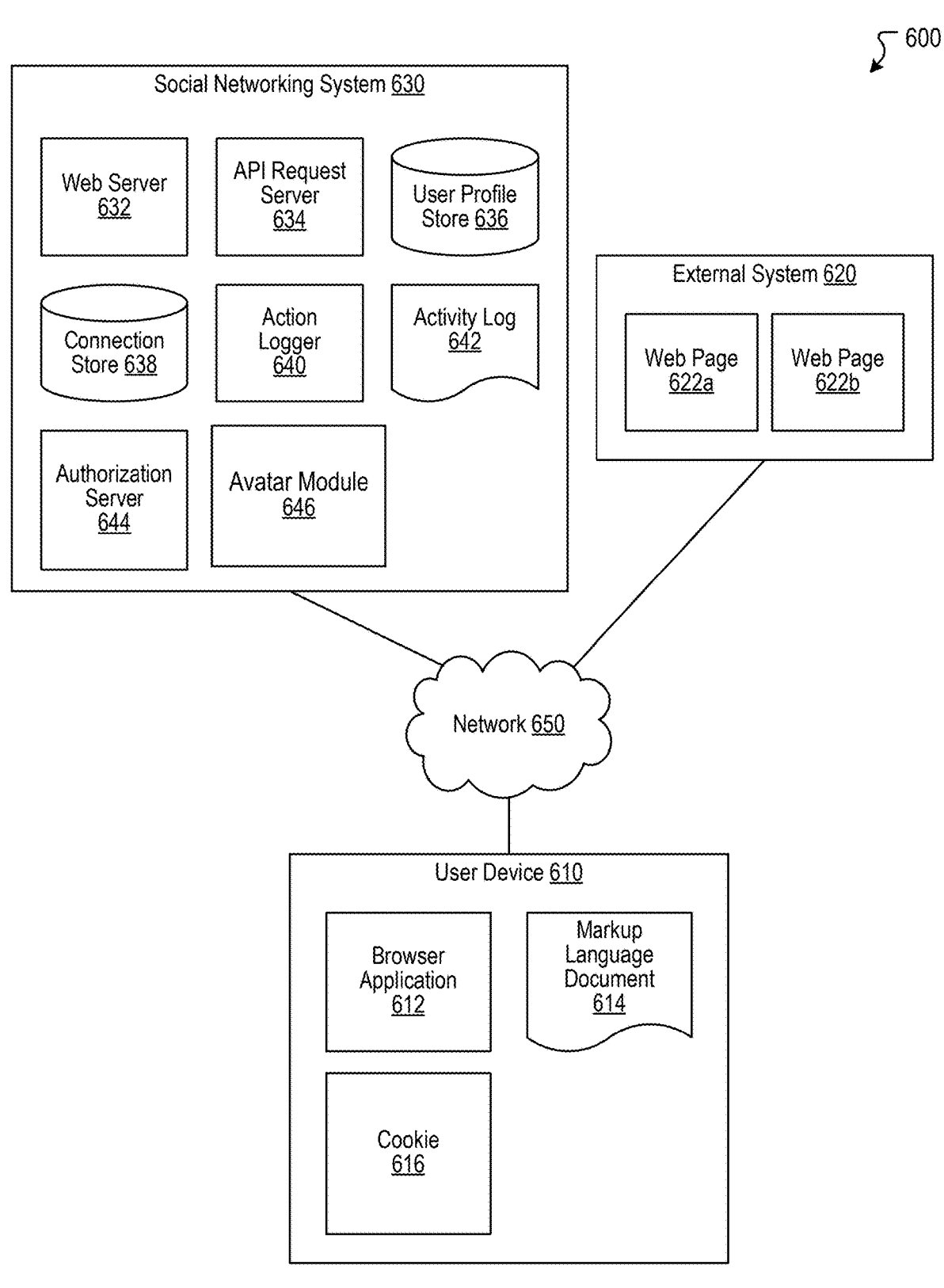
FIG. 6 illustrates a network diagram of an example system including an example social networking system, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way". For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an avatar module 646. The avatar module 646 can be implemented with the avatar module 102, as discussed in more detail herein. In various embodiments, some or all functionality of the avatar module 646 can be additionally or alternatively implemented by the user device 610. It should be appreciated that there can be many variations or other possibilities.

Hardware Implementation

Figure 7:
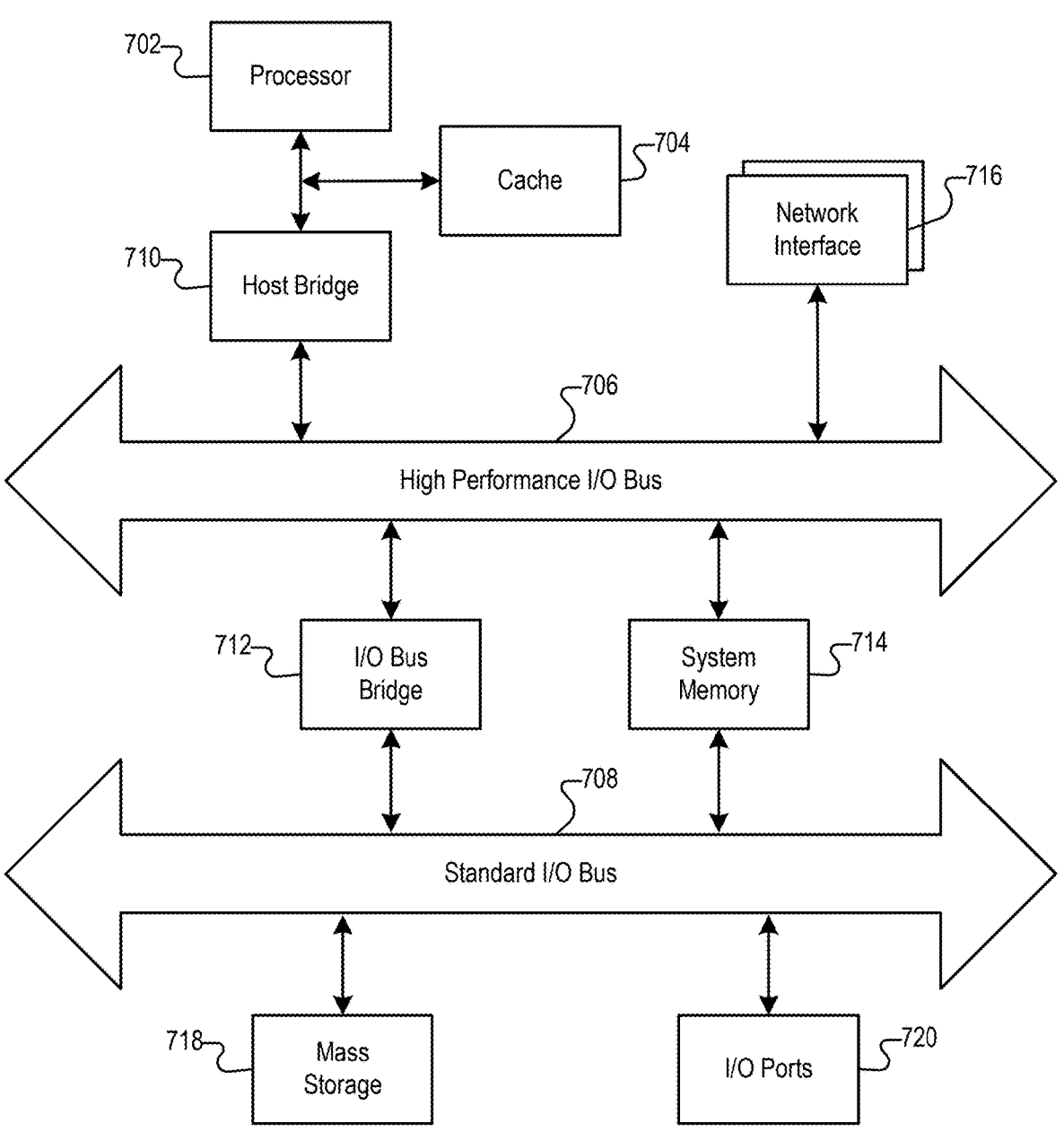
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718.

However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, a plurality of avatar poses associated with a user;
   receiving, by the computing system, a selection of an avatar pose from the user;
   generating, by the computing system, an avatar sticker comprising the avatar pose;
   generating a social media post including the avatar sticker, wherein text, a font, and a background for the social media post are selected by the user;
   wherein the background is an image captured by a camera of a device;
   determining a captured selfie image of the user; and
   generating an avatar with a pose corresponding to a pose of the user in the captured selfie image.

2. The computer-implemented method of claim 1, wherein the avatar sticker further comprises at least one prop selected by the user.

3. The computer-implemented method of claim 1, wherein the avatar pose reflects a facial expression and a body gesture of the user.

4. The computer-implemented method of claim 1, wherein the avatar sticker is a pre-generated avatar sticker from a listing of pre-generated avatar stickers not customized by the user.

5. The computer-implemented method of claim 1, wherein the avatar sticker was customized by the user.

6. The computer-implemented method of claim 5, further comprising:
   storing the avatar sticker; and
   providing for the user a listing of avatar stickers comprising the avatar sticker.

7. The computer-implemented method of claim 1, wherein the avatar sticker comprises a first panel and a second panel, wherein the first panel displays an avatar in a first pose and the second panel displays the avatar in a second pose.

8. The computer-implemented method of claim 1, wherein the pose includes a body gesture of the user in the captured selfie image and a facial expression of the user in the captured selfie image.

9. The computer-implemented method of claim 1, wherein the image is captured in real-time.

10. A system comprising:

at least one processor; and a memory storing instructions that, when executed by the at least one processor, cause the system to perform operations comprising:

provising a plurality of avatar poses associated with a user;

receiving a selection of an avatar pose from the user;

generating an avatar sticker comprising the avatar pose;

generating a social media post including the avatar sticker, wherein text, a font, and a background for the social media post are selected by the user;

wherein the background is an image captured by a camera of a device;

determining a captured selfie image of the user; and generating an avatar with a pose corresponding to a pose of the user in the captured selfie image.

11. The system of claim 8, wherein the avatar sticker further comprises at least one prop selected by the user.

12. The system of claim 8, wherein the avatar pose reflects a facial expression and a body gesture of the user.

13. A non-transitory computer-readable storage medium including instructions that, when executed by at least one processor of a computing system, cause the computing system to perform operations comprising:

providing a plurality of avatar poses associated with a user;

receiving a selection of an avatar pose from the user;

generating an avatar sticker comprising the avatar pose;

generating a social media post including the avatar sticker, wherein text, a font, and a background for the social media post are selected by the user;

wherein the background is an image captured by a camera of a device;

determining a captured selfie image of the user; and generating an avatar with a pose corresponding to a pose of the user in the captured selfie image.

14. The non-transitory computer-readable storage medium of claim 13, wherein the avatar sticker further comprises at least one prop selected by the user.

15. The non-transitory computer-readable storage medium of claim 13, wherein the avatar pose reflects a facial expression and a body gesture of the user.

* * * * *